United States Patent [19]

Naitou et al.

[11] Patent Number: 4,982,805
[45] Date of Patent: Jan. 8, 1991

[54] CONSTANT-SPEED CRUISE CONTROL APPARATUS FOR A VEHICLE

[75] Inventors: Yasuo Naitou; Akihiko Mori, both of Himeji, Japan

[73] Assignee: Mitsubishi Denki Kabushiki Kaisha, Tokyo, Japan

[21] Appl. No.: 259,664

[22] Filed: Oct. 19, 1988

[30] Foreign Application Priority Data

Oct. 22, 1987 [JP] Japan ............................. 62-268455
Oct. 22, 1987 [JP] Japan ............................. 62-268456

[51] Int. Cl.$^5$ ............................................. B60K 31/04
[52] U.S. Cl. ................................... 180/179; 74/860; 180/170; 364/424.1; 364/426.04
[58] Field of Search .................. 180/170, 177, 179; 364/424.1, 426.01, 426.04; 74/859, 860

[56] References Cited

U.S. PATENT DOCUMENTS

| | | | |
|---|---|---|---|
| 4,202,424 | 5/1980 | Sakakibara et al. | 180/176 |
| 4,421,192 | 12/1983 | Ito et al. | 180/179 |
| 4,463,822 | 8/1984 | Tanigawa et al. | 180/179 |
| 4,697,478 | 10/1987 | Mastumoto et al. | 180/179 |
| 4,829,435 | 5/1989 | Isono | 364/424.1 |

FOREIGN PATENT DOCUMENTS

| | | | |
|---|---|---|---|
| 142044 | 5/1985 | European Pat. Off. | 180/170 |
| 57-121713 | 7/1982 | Japan . | |
| 58-98636 | 6/1983 | Japan . | |
| 238521 | 10/1986 | Japan | 180/170 |
| 231826 | 10/1987 | Japan | 180/170 |

Primary Examiner—Charles A. Marmor
Assistant Examiner—Eric Culbreth
Attorney, Agent, or Firm—Sughrue, Mion, Zinn, Macpeak & Seas

[57] ABSTRACT

The invention relates to a constant-speed cruise control apparatus for automatically controlling the cruise speed of a vehicle to permit the vehicle to cruise at a constant speed. The gradient of a road is estimated on the basis of an actual cruise speed of the vehicle, the opening of a throttle valve, and cruise performance characteristics of the vehicle which indicates the relationship between the cruise speed and the opening of a throttle valve. If it determines that the road is uphill, and moreover, the absolute value of a speed deviation (i.e., a deviation of the actual cruise speed from a target speed) is more than a predetermined value, shifting down is carried out. Subsequently, if the absolute value of the speed deviation is less than another predetermined value, and moreover, it is determined that the road is downhill, shifting up is carried out. Through such shift-up and shift-down control on the basis of both the speed deviation and the road gradient, it is possible to perform speed change control according to the conditions of the surface of a road, thereby carrying out a highly reliable constant speed cruise of the vehicle.

1 Claim, 5 Drawing Sheets

CONSTANT-SPEED CRUISE CONTROL APPARATUS FOR A VEHICLE

BACKGROUND OF THE INVENTION

1. Field of the Invention

This invention relates to a constant-speed cruise control apparatus for a vehicle, whose operation automatically maintains the cruise speed of the vehicle at constant speed.

2. Description of the Prior Art

Recently, automobiles and the like have come to be equipped with a constant-speed cruise control apparatus where a target speed is preset so that the vehicle can automatically be controlled to cruise at the particular target speed during its constant speed cruise. A typical example of the constant speed cruise control apparatus is one disclosed in Japanese Patent Laid-Open Publication No. 58-98636. According to this disclosure, a target cruise speed is preset for a vehicle such as automobiles, and the vehicle is caused to cruise at the target speed during its constant speed cruise. Target speed setting is carried out when the vehicle is cruising at such a cruise speed as is desired for constant speed cruise. Thus, the cruise speed at that time is set as a target speed for subsequent cruise. While a specified gain is applied to a deviation of a cruise speed signal from a target speed signal, a specified gain is also applied to an acceleration signal so that the two signals can be arithmetically operated and a signal for driving a throttle valve can be issued to an actuator, thereby getting the cruise speed closer to the target speed. According to another arrangement disclosed in Japanese Patent Laid-Open Publication No. 57-121713, when a controlled variable outputted to a throttle drive means is greater than a value being set on the basis of transmission position, the arrangement determines it difficult to maintain the vehicle cruise speed and accordingly shift-down is effected.

With the prior-art constant-speed cruise control apparatus as described above, when the road goes uphill and it becomes difficult to continue cruising at the target speed, shift-down is carried out. However, because timing for next shift up is preset by timer or the like, there has been problems that when the road is still uphill, shift-up is undesirably provided, and conversely when the road is downhill, shift-down is provided.

SUMMARY OF THE INVENTION

This invention is directed to solve the foregoing problem, and the control apparatus according to the invention includes a means for estimating a road gradient on the basis of an actual cruise speed, cruise performance characteristics of the vehicle, and the opening of a throttle value, and a control means which carry out shift-up and shift-down controls of the vehicle on the basis of the estimated gradient and a speed deviation (i.e., a deviation of the cruise speed from a target speed).

The first object of the invention is to provide a constant-speed cruise control apparatus for a vehicle, which can perform shift-up and shift-down controls according to the uphill or downhill condition of a road.

The second object of the invention is to provide a constant-speed cruise control apparatus for a vehicle, which makes it possible to set timing for changeover from shift-up to shift-down and vise versa according to the actual gradient condition of a road.

The third object of the invention is to provide a constant-speed cruise control apparatus for a vehicle, which provides highly reliable constant speed cruise of a vehicle, irrespective of the gradient condition of a road.

The fourth object of the invention is to provide a constant-speed cruise control apparatus for a vehicle, wherein a shift line is determined on the basis of the gradient of a road at the time when a shift-down command is issued and, if any gradient smaller than the shift line is involved, a shift-up command is issued, it being thus possible to accurately cope with any variation in cruise performance of the vehicle under the influence of the load condition of the vehicle or of wind resistance.

The above and further objects and features of the invention will more fully be apparent from the following detailed description with accompanying drawings.

DESCRIPTION OF THE PREFERRED EMBODIMENTS

Preferred embodiments of the invention will now be described in detail with reference to the accompanying drawings.

Figure 1:
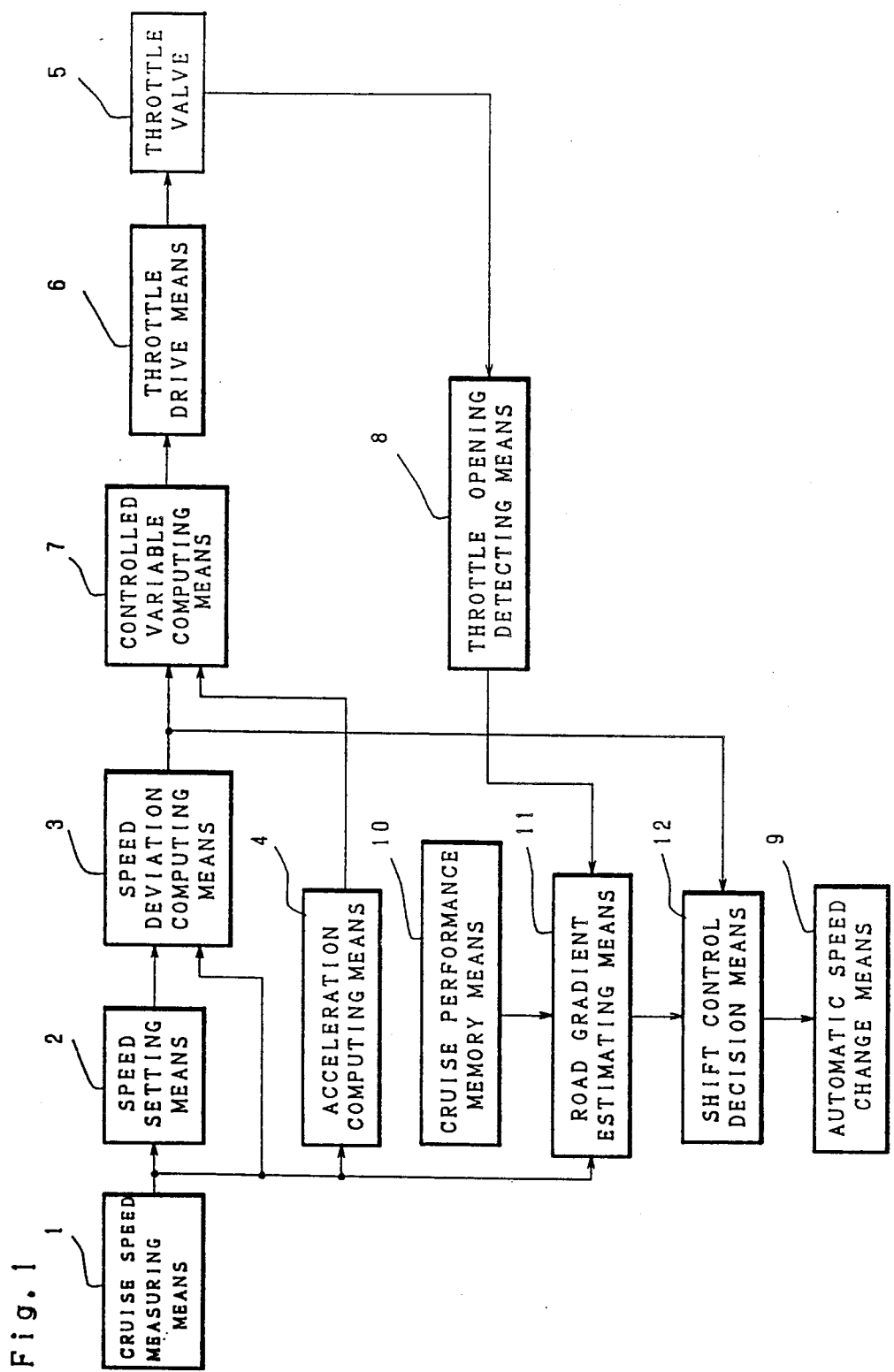
FIG. 1 is a block diagram showing an arrangement of a first embodiment of the invention.

FIG. 1 is a block diagram showing an arrangement of a first embodiment of the invention. In FIG. 1, numeral 1 designates a cruise measuring means for measuring an actual cruise speed of a vehicle, and numeral 2 designates a speed setting means for setting a target speed desired by the driver. A cruise speed signal from the cruise speed measuring means 1 and a target speed signal from the speed setting means 2 are outputted to a speed deviation computing means 3, in which a speed deviation is calculated with respect to the actual speed and the target speed, the result of the calculation being outputted, as a speed deviation signal, to a controlled variable computing means 7 and also to a shift control decision means 12 which will both be described hereinafter.

A cruise speed signal is also outputted from the cruise speed measuring means 1 to an acceleration computing means 4, in which a vehicle acceleration value is calculated on the basis of the cruise speed signal, and the result of the calculation is outputted, as an acceleration signal, to the controlled variable computing means 7. The controlled variable computing means 7 outputs a pulse signal, which is determined on the basis of both the speed deviation signal and the acceleration signal, to a throttle drive means 6 which drives a throttle valve 5 for controlling the drive force of the vehicle, in order to reconcile the cruise speed with the target speed. A throttle opening detecting means 8 detects the opening of the throttle valve 5, and the result of the detection is outputted, as a throttle opening signal, from the throttle opening detecting means 8 to a road gradient estimating means 11 which is to be described hereinafter.

A cruise performance memory means 10 stores therein cruise performance characteristics of the vehicle as expressed in terms of the relationship between the cruise speed and the throttle opening in cruising on a sloped road, and the content of the memory means 10 is outputted to the road gradient estimating means 11 as required. The road gradient estimating means 11 receives a cruise speed signal from the cruise speed measuring means 1 and estimates an actual gradient of the road while a vehicle is cruising on the basis of the cruise speed signal, the throttle opening signals and the cruise performance characteristics, after that the estimation is outputted as road gradient information to the shift control decision means 12. Numeral 9 designates an automatic speed change means capable of automatic shift-up or shift-down of vehicle transmissions. When the shift control decision means 12 decides that the road is uphill on the basis of the speed deviation signal and the road gradient information, and moreover, the speed deviation is greater than a predetermined value, it outputs a shift-down command to the automatic speed change means 9. Subsequently, if the speed deviation is greater than the predetermined value and the road is determined to be downhill, a shift-up command is outputted to the automatic speed change means 9.

Next, the manner of operation of the first embodiment will be explained with reference to a flow chart shown in FIG. 2. When power is inputted, a microcomputer starts arithmetic operation at step 101 and initial setting is effected with individual ports and memories. At step 102, cruise speed $V_n$ is calculated by using a cycle of vehicle speed pulses stored through an interrupt handling routine (not shown). It is noted that step 102 and subsequent steps constitute a loop completing each in a predetermined time $T_O$ which is controlled by standby step 117. At step 103, vehicle acceleration $\alpha_n$ is calculated according to the following equation:

$$\alpha_n = \frac{V_n - V_{n-1}}{T_O}$$

in which $V_{n-1}$ is a cruise speed at the time of previous sampling.

At step 104, speed deviation $\epsilon_n$ of cruise speed $V_n$ relative to target speed $V_M$ (not shown) is determined.

$$\epsilon_n = V_n - V_M$$

At step 105, a throttle opening signal $\theta_n$ is inputted. At step 106, road gradient tan $\delta_n$ is estimated in such a manner as will be hereinafter described. At step 107, decision is made as to whether the vehicle is cruising at constant speed. If the decision is NO, the program proceeds to step 117. If the vehicle is cruising at constant speed, at step 108, decision is made as to whether the state of shift down is on or not. If the decision is NO, at step 109, checking is made to ascertain $|\epsilon_\eta| \geq A$, that is, whether or not cruise speed $V_n$ is lower than target speed $V_M$ by more than specified value A. If the cruise speed is lower by the value A, at step 110 checking is made to determine whether or not gradient tan $\delta_n$ is more than specified value B, that is, whether or not the road involves an uphill having a gradient greater than specified value B. If it is determined that the road is uphill, a shift-down signal is issued at step 111. If decision at step 108 is that the state of shift-down is on, at step 112, checking is made to ascertain whether $|\epsilon_\eta|$ is lower than specified value C. If $|\epsilon_\eta| \leq C$, at step 113 checking is made to see whether or not gradient tan $\delta_n$ is lower than specified value D. If tan $\delta_\eta \leq D$, *a shift-up signal is issued at step* 114. *A step* 115, *a controlled variable is calculated on the basis of acceleration* $\alpha_n$ and speed deviation $\epsilon_\eta$ according to the following equation for example, so that the cruise speed $V_n$ can be equal to the target speed $V_M$.

$$T_n = K_1 \alpha_\eta + K_2 \epsilon_\eta$$

wherein $K_1$ and $K_2$ designate constants.

At step 116, pulse signals are outputted so that the throttle can be opened or closed according to each relevant $T_n$ expression (symbol and value). In other words, if $T_n > 0$, pulse signals are outputted in a throttle closing direction; if $T_n < 0$, pulse signals are outputted in a throttle opening direction; and if $T_n \approx 0$, pulse signals are outputted only for the value of $T_n$ so that the throttle opening can be kept as it is. A step 117, the program returns to step 102 after waiting until the specified time $T_O$ has lapsed, and individual steps are executed in the same way as described above.

Figure 3:
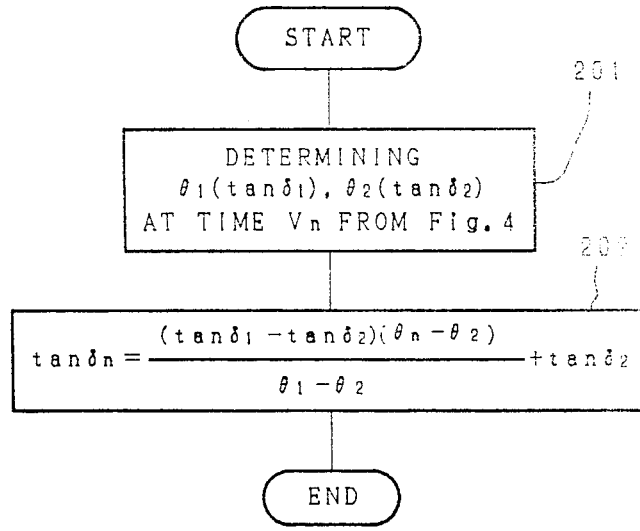
FIG. 3 is a flow chart illustrating the mode of operation for estimating a road gradient.
Figure 4:
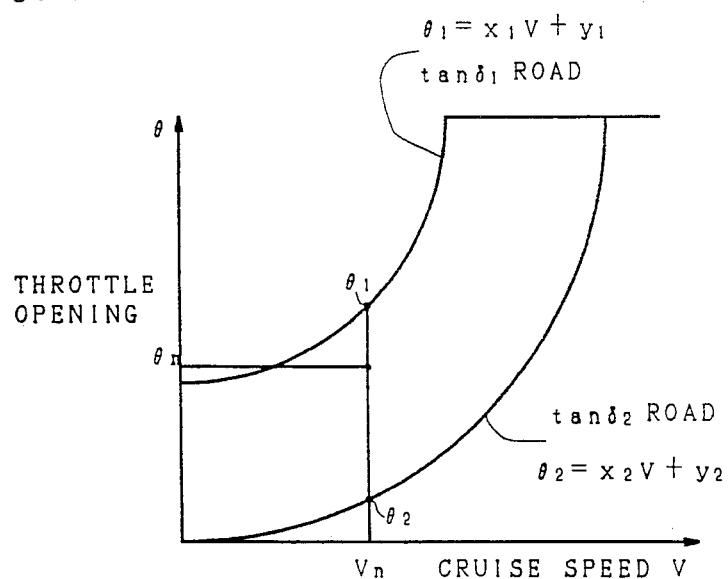
FIG. 4 is a graph illustrating the mode of operation for estimating a road gradient.

Next, how to determine a road gradient will be explained with reference to the flow chart showing in FIG. 3 and the graph in FIG. 4. It is noted that in FIG. 4 the axis of ordinates represents throttle opening $\theta$ and the axis of abscissas represents cruise speed V. The microcomputer stores the curves shown in the graph, namely, $\theta_1 = X_1 V + y_1$ (cruise performance characteristics in case of gradient tan $\delta_1$) and $\theta_2 = X_2 V + y_2$ (cruise performance characteristics in case of gradient tan $\delta_2$). First, at step 201, throttle openings $\theta_1$, $\theta_2$ on the tan $\delta_1$ and tan $\delta_2$ roads at cruise speed $V_n$ are calculated. At step 202, gradient tan $\delta_\eta$ on which the vehicle is cruising is calculated according to the following equation:

$$\tan\delta_n = \frac{(\tan\delta_1 - \tan\delta_2)(\theta_n - \theta_2)}{\theta_1 - \theta_2} + \tan\delta_2,$$

following which it is possible to determine the gradient of the road. Control of the timing for shift-up/shift-down changeover from one to the other can thereby be effected according to the actual road condition.

Figure 5:
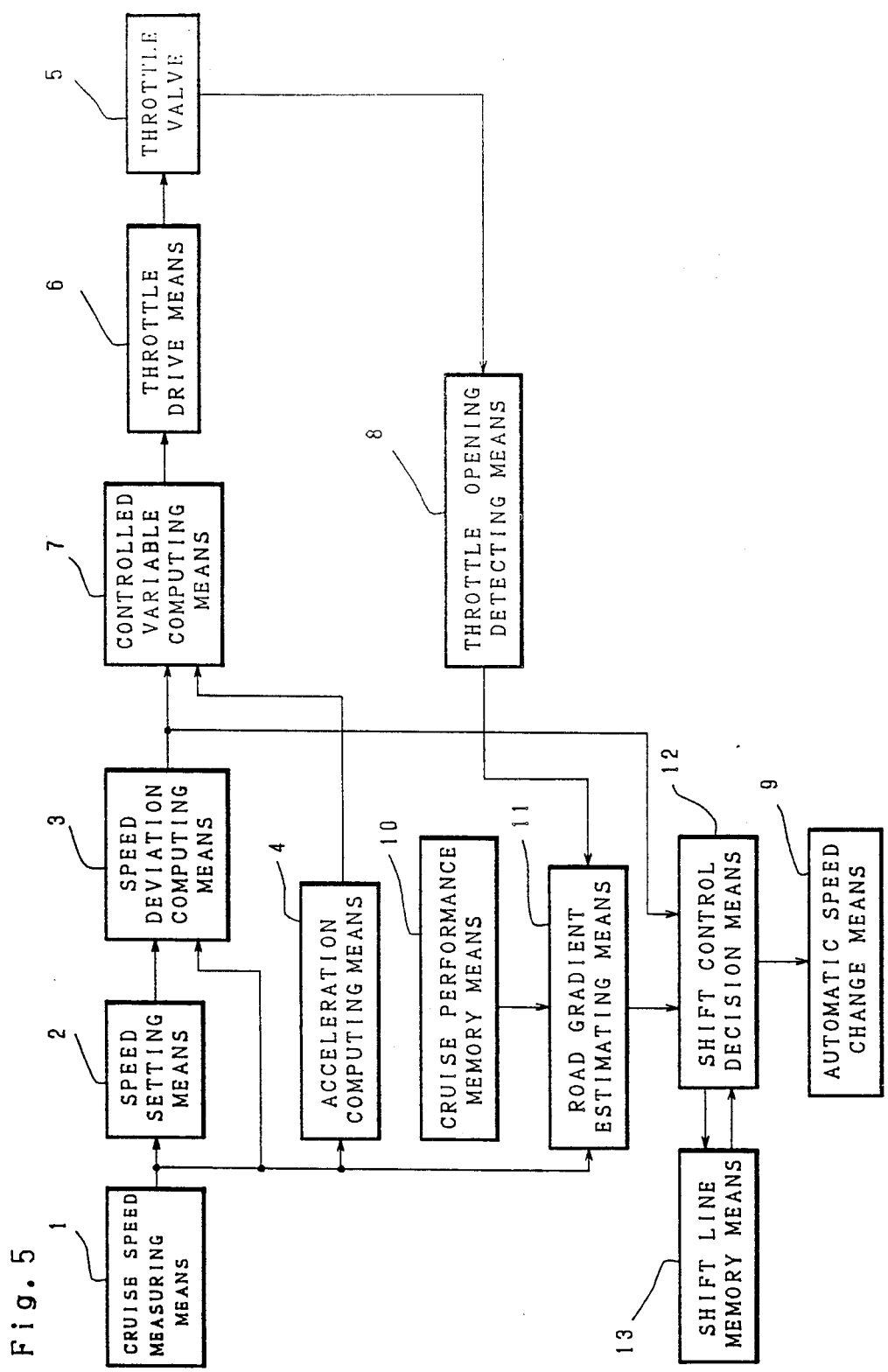
FIG. 5 is a block diagram showing an arrangement of a second embodiment of the invention.

FIG. 5 is a block diagram showing an arrangement of the second embodiment of the invention. In this embodiment, a shift line, which designates a specific value at determining the timing for issuing a shift-up command, is stored after being predetermined on the basis of the gradient of a road at the time when a shift-down command is issued. If the road gradient becomes lower than this shift line, and moreover, the absolute value of the speed deviation is smaller than the specific value, a shift-up command is issued.

In FIG. 5, the shift control decision means 12 outputs to a shift-line memory means 13 the road gradient taken at the time when the shift-down command is issued to the automatic speed change means 9. The shift-line memory means 13 determines a shift line on the basis of this gradient and stores it therein. At determining a timing for shifting up, the shift line stored in memory is, as required, outputted from the shift line memory means 13 to the shift control decision means 12. In FIG. 5, since those components, which are designated by numerals identical with those in FIG. 1, represent parts identical with those in FIG. 1, description of those parts is omitted herein.

Figure 6:
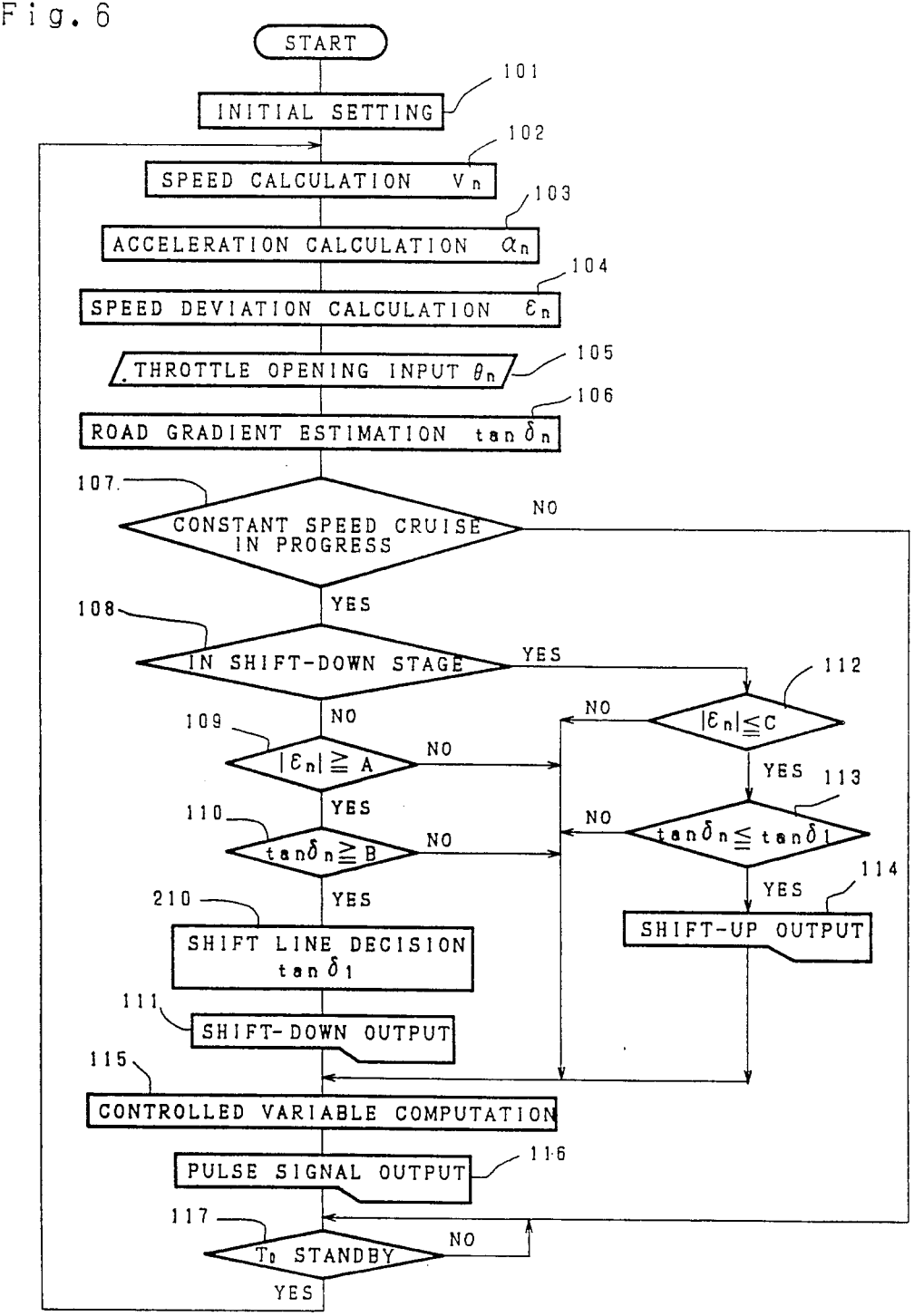
FIG. 6 is a flow chart illustrating the manner of operation of the second embodiment.

FIG. 6 is a flow chart illustrating the sequence of operation in the second embodiment. In FIG. 6, since the steps 101, 102, 103, 104, 105, 106, 107, 108, 109, 110 perform the same functions as those designated by the same numerals in the FIG. 2 flow chart, description thereof is omitted herein. In this second embodiment, if a descision is made that the road is uphill (YES at step 110), at step 210, shift line value tan $\delta_1$ for next shift-up is calculated using the road gradient tan $\delta$ at the time, as shown in the following equation:

$$\tan \delta_1 = \tan \delta_\eta - \beta(t)$$

wherein it is understood that $\beta(t)$ decreases with time t as $0 \leq \beta(t)$.

If it is determined that the road is uphill, at step 111 a shift-down signal is outputted as in the above-described first embodiment.

If, at step 108, it is determined that a shift-down is on, at step 112, checking is made to see whether or not the absolute value $|\epsilon_\eta|$ of the speed deviation is lower than the specified value C. If $|\epsilon_\eta| \leq C$, at step 113, the magnitude of the present road gradient tan $\delta$ is checked in relation to the relevant specified value (specified value D in the first embodiment). In the present embodiment, for the specified value, shift line value tan $\delta_1$ calculated at step 210 is used. If tan $\delta_\eta \leq$ tan $\delta_1$, at step 114, a shift-up signal is outputted.

Figure 2:
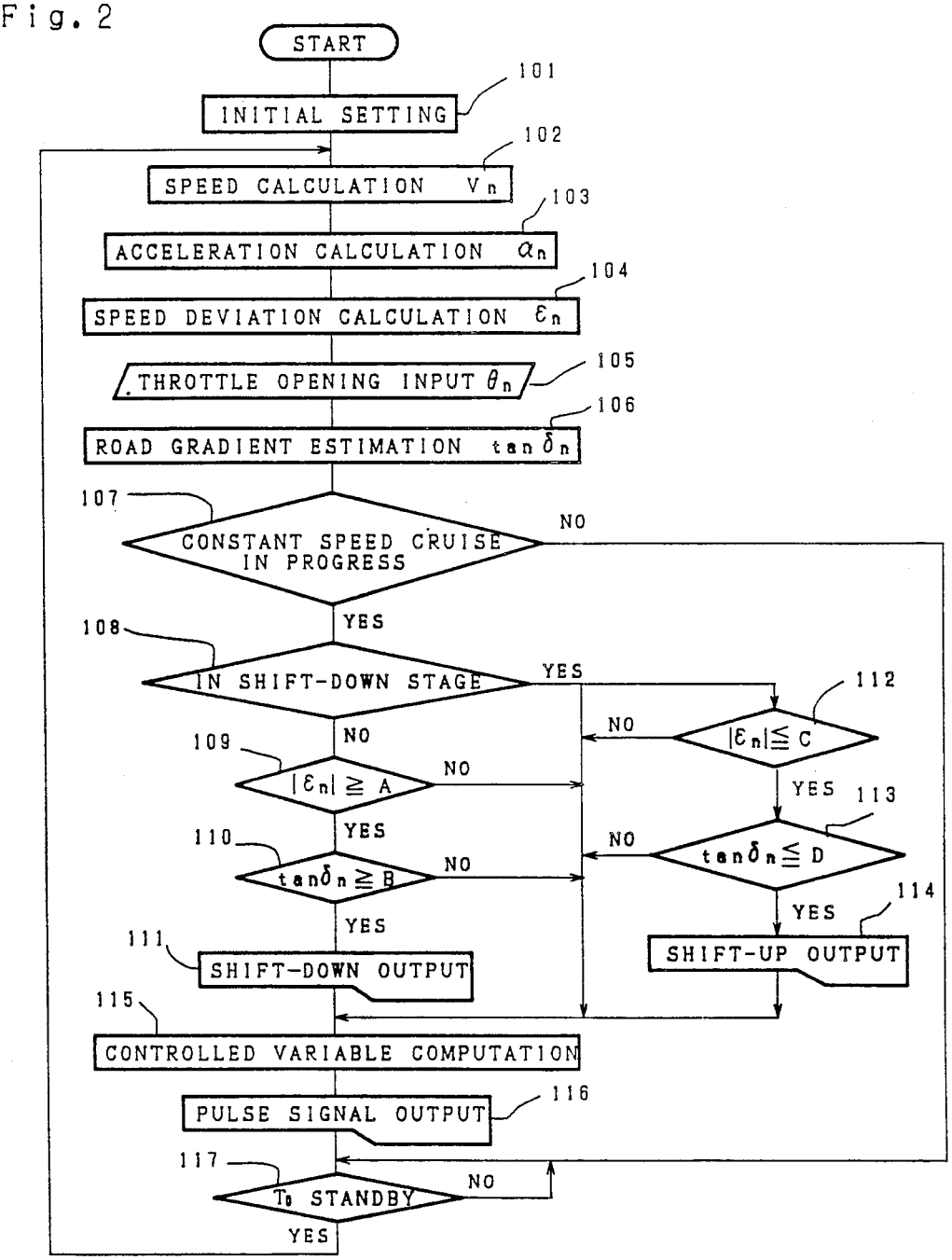
FIG. 2 is a flow chart illustrating the manner of operation of the first embodiment.

In FIG. 6, since steps 115, 116, 117 perform the same functions as those designated by the same numerals in the FIG. 2 chart, description thereof is omitted herein. The manner of estimating road gradients in this second embodiment is the same as that in the first embodiment.

With the second embodiment, needless to say, it is possible to control the timing for shift-up/shift-down changeover according to the actual road condition in the same manner as in the first embodiment. Further, the second embodiment makes it possible to positively cope with variations in cruise performance characteristics of the vehicle.

In both the first and the second embodiments, the apparatus incorporates throttle opening detecting means 8, cruise performance characteristic memory means 10, road gradient estimating means 11, and shift control decision means 12. Alternatively, it is practicable to arrange so that an electronic speed change control apparatus incorporates all these means and the apparatus of the invention transmits speed deviation signals to the relevant components of the electronic apparatus, thereby constituting a system.

In the above embodiments, the case, where shifting down takes place first on an uphill road, and shifting up takes place next, is described. Needless to say, it can also be said in the case where shifting up first on a downhill road and shifting down next.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A constant-speed cruise control apparatus for a vehicle comprising:
   a means for measuring an actual cruise speed for a vehicle comprising:
   a means for setting a target speed,
   a means for computing a speed deviation of said cruise speed for said target speed,
   a means for computing an acceleration of the vehicle on the basis of said cruise speed,
   a throttle valve for controlling a driving force of the vehicle,
   a drive means for driving said throttle valve,
   a means for computing a controlled variable of said drive means so as to reconcile said cruise speed with said target speed,
   a means for detecting the opening of said throttle valve,
   an automatic speed change means capable of automatically shifting up or shifting down a transmission of the vehicle,
   a means for storing therein cruise performance characteristics on at least two roads having different gradients from each other expressed in terms of a relationship between the cruise speed and the opening of said throttle valve,
   a means for estimating the gradient of a road on which the vehicle cruises on the basis of said cruise speed, the detected opening of said throttle valve and said stored cruise performance characteristics in accordance with:

$$\tan \delta_n = \frac{(\tan \delta_1 - \tan \delta_2)(\theta_n - \theta_2)}{\theta_1 - \theta_2} + \tan \delta_2$$

where:

tan $\delta_1$ is a road gradient for a throttle valve opening $\theta_1$ at said actual cruise speed, tan $\delta_2$ is a road gradient for a throttle valve opening $\theta_2$ at said actual cruise speed, tan $\delta_n$ is the estimated gradient of the road on which the vehicle is cruising, and a control means which outputs a shift-down command to said automatic speed change means when the absolute value of said speed deviation is more than a first value, or said estimated gradient is more than a second value, and after said shift-down command is output, outputs a shift-up command to said automatic speed change means when the absolute value of said speed deviation is less than a third value and said gradient is less than a fourth value.

* * * * *